(12) United States Patent
Dubois et al.

(10) Patent No.: US 11,498,063 B2
(45) Date of Patent: *Nov. 15, 2022

(54) SELECTIVELY FUNCTIONALIZED POROUS MATERIAL

(71) Applicant: International Business Machines Corporation, Armonk, NY (US)

(72) Inventors: Geraud J. Dubois, Los Altos, CA (US); Bruno Michel, Zurich (CH); Patrick Ruch, Jenins (CH); Sarmenio Saliba, Thalwil (CH); Willi Volksen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 420 days.

This patent is subject to a terminal disclaimer.

(21) Appl. No.: 16/593,019

(22) Filed: Oct. 4, 2019

(65) Prior Publication Data

US 2020/0030784 A1    Jan. 30, 2020

Related U.S. Application Data

(62) Division of application No. 14/885,514, filed on Oct. 16, 2015, now Pat. No. 10,471,418.

(51) Int. Cl.
*B01J 35/10* (2006.01)
*B01J 21/08* (2006.01)

(52) U.S. Cl.
CPC .......... *B01J 35/1061* (2013.01); *B01J 21/08* (2013.01); *B01J 35/109* (2013.01); *B01J 35/1057* (2013.01)

(58) Field of Classification Search
None
See application file for complete search history.

(56) References Cited

U.S. PATENT DOCUMENTS

| 4,234,367 A | 11/1980 | Herron et al. |
| 4,971,738 A | 11/1990 | Herron et al. |
| 5,053,361 A | 10/1991 | Herron et al. |
| 5,139,975 A | 8/1992 | Herron et al. |

(Continued)

OTHER PUBLICATIONS

List of IBM Applicants Treated as Related.
(Continued)

*Primary Examiner* — Colin W. Slifka
*Assistant Examiner* — Michael Forrest
(74) *Attorney, Agent, or Firm* — Karen Canaan; CanaanLaw, P.C.

(57) ABSTRACT

A porous substrate susceptible to one or both of hydroxylation and alkoxylation by a first protic solvent is exposed to a first relative pressure of the first protic solvent. The porous substrate includes a first plurality of pores having a first average pore diameter and a second plurality of pores having a second average pore diameter that is greater than the first average pore diameter. The first relative pressure is effective to one or both of hydroxylate or alkoxylate substantially only pores of the first average pore diameter to form a first modified porous substrate. The first modified porous substrate is reacted with a first functionalizing reagent that is effective to functionalize one or both of hydroxylated or alkoxylated surfaces, thereby functionalizing substantially only the first plurality of the pores, to form a first functionalized porous substrate.

12 Claims, 12 Drawing Sheets

(56) References Cited

U.S. PATENT DOCUMENTS

| | | | |
|---|---|---|---|
| 5,593,729 A * | 1/1997 | Frechet | B01J 20/28069 |
| | | | 427/337 |
| 6,482,324 B2 * | 11/2002 | Kirkland | B01J 20/3204 |
| | | | 210/656 |
| 8,258,197 B2 | 9/2012 | Lavigne et al. | |
| 8,394,396 B2 | 3/2013 | Brick et al. | |
| 8,703,834 B2 | 4/2014 | Nair | |
| 8,829,062 B1 | 9/2014 | Minko et al. | |
| 2011/0240907 A1 | 10/2011 | Sharma et al. | |
| 2017/0106362 A1 | 4/2017 | Dubois et al. | |

OTHER PUBLICATIONS

Brinker et al., "Surface Structure and Chemistry of High Surface Area Silica Gels," Journal of Non-Crystalline Solids 120 (1990) 26-33, Elsevier Science Publishers B.V., Jan. 1, 1990, pp. 26-33.

Yano et al., "Synthesis of Hexagonally Ordered Super-Microporous Silicas, Using Conventional Alkyltrimethylammonium Bromide, as Adsorbents for Water Adsorption Heat-Pump Systems", The Chemical Society of Japan, Bull. Chem. Soc. Jpn., 76, 2103-2109, Apr. 14, 2003, pp. 2103-2109.

Inagaki et al., "Adsorption of water vapor and hydrophobicity of ordered mesoporous silicia, FSM-16," Microporous and Mesoporous Materials, May 21, 1998, pp. 667-672.

Prosecution History from U.S. Appl. No. 14/885,514 dated Jul. 12, 2018 through Sep. 24, 2019, 59 pp.

Yang et al., "Selective Surface Functionalization and Metal Deposition in the Micropores of Mesoporous Silica SBA-15", May 25, 2017, 7 pgs.

* cited by examiner

"SELECTIVELY FUNCTIONALIZED POROUS MATERIAL"

This application is a divisional of U.S. application Ser. No. 14/885,514, filed Oct. 16, 2015, which is incorporated herein by reference in its entirety.

BACKGROUND

Natural and synthetic porous materials and media are widely used as substrates in various articles and processes. Porous materials may include macroporous, mesoporous, microporous, or nanoporous materials, or combinations thereof. Porous materials may include metals, oxides, polymers, or other materials. Porous materials may be manufactured using casting, infiltration, foaming, deposition, drying, or supercritical drying. Depending on the application, porous materials may be pre-treated or further treated using thermal, chemical, acoustic, electrical, or other treatments.

Functionalized porous materials may be used in a wide variety of applications, For example, functionalized porous material, such as functionalized porous silica, may be used in applications including sensors, catalysts, heavy metal recovery, and drug delivery. Materials such as aminomethyl-anthracene functionalized, templated porous silica may be used for sensing ATP by fluorescence quenching. Materials such as thiol-functionalized, templated porous silica may be used for heavy metal ion recovery. Porous materials may be used for catalysis, for instance, silica based catalyst supports including W-peroxo compounds for epoxidation, Grubb's catalyst for metathesis (double replacement reaction) and allylic amination. Controlled release by chemical reduction of disulfide linkage between CdS and porous silica may be used for drug delivery via CdS nanoparticles.

Known techniques for such functionalization are performed using a synthetic grafting approach of porous oxides with pore sizes tailored for the particular target application. Some porous oxide surfaces may not be amenable to direct functionalization, and therefore some techniques for functionalization of porous substrates may include an intermediate hydroxylation step to introduce hydroxyl groups on surfaces, which can subsequently be functionalized with functional groups. However, in known techniques that employ hydroxylation as an intermediate step, the functionalization step functionalizes all available hydroxyl groups. Therefore, all hydroxylated surfaces may get functionalized.

Conventional techniques of functionalizing may result in nonselective functionalization of pores, where pores are randomly functionalized with functional groups irrespective of their pore size. FIG. 1 is a conceptual diagram presenting a lateral cross-sectional view of a structure including a porous material exhibiting a broad pore size distribution, functionalized by existing nonselective techniques. Porous substrate 120 includes a plurality of pores 140. The plurality of pores 140 includes a first plurality of pores 140a having a first average pore size, a second plurality of pores 140b having a second average pore size, and a third plurality of pores 140c having a third average pore size. In examples, the first average pore size is smaller than the second average pore size, and the second average pore size is smaller than the third average pore size. Nonselective techniques of functionalizing porous substrate 120 with different functional groups, for instance, a first functional group A, a second functional group B, and a third functional group C, typically result in nonuniform and nonselective functionalization of pores that is not correlated with the average pore size. This may result from a failure of conventional techniques to selectively hydroxylate pores depending on their pore sizes, whereby a subsequent functionalization of the hydroxylated pores results in nonselective functionalization. For example, each of the first plurality of pores 140a, the second plurality of pores 140b, and the third plurality of pores 140c, may be hydroxylated and functionalized, or directly functionalized by either of functional groups A, B, or C, regardless of the average pore size of the respective plurality of pores, ultimately resulting in a nonselectively functionalized substrate, as shown in FIG. 1.

SUMMARY

In conventional techniques, functionalization occurs via available hydroxyl groups in all pores. The hydroxyl group content is primarily controlled by the synthesis method and calcination temperature of the corresponding oxide. However, certain applications may require selective functionalization of pores of a first average pore size with a first functional group, and pores of a second average pore size with a second functional group, and so on. Other applications may require that only pores of a first average pore size, or only pores having an average pore size less than a first threshold be functionalized with a first functional group, and that no other pores be functionalized.

In general, the present disclosure describes techniques for controlled functionalization of porous materials over a wide range of pore sizes. In contrast with nonselective techniques, methods of the present disclosure allow for selective hydroxylation of pores depending on their pore size, which can be used to target a specific band of pore sizes or diameters for functionalization, using an inexpensive base material.

An example technique includes exposing a porous substrate susceptible to one or both of hydroxylation and alkoxylation by a first protic solvent to a first relative pressure of the first protic solvent. The porous substrate includes a first plurality of pores having a first average pore diameter and a second plurality of pores having a second average pore diameter that is greater than the first average pore diameter. The first relative pressure is effective to one or both of hydroxylate or alkoxylate substantially only pores of the first average pore diameter to form a first modified porous substrate. The example technique may include reacting the first modified porous substrate with a first functionalizing reagent that is effective to functionalize one or both of hydroxylated or alkoxylated surfaces, thereby functionalizing substantially only the first plurality of the pores, to form a first functionalized porous substrate.

An example article includes a functionalized porous substrate including a first plurality of pores having a first average pore diameter and a second plurality of pores having a second average pore diameter that is greater than the first average pore diameter. The first plurality of pores is functionalized with a first predetermined functional group, and the second plurality of pores is substantially free of the first predetermined functional group.

Another example article includes a porous substrate including a first plurality of pores having a first average pore diameter and a second plurality of pores having a second average pore diameter that is greater than the first average pore diameter. Substantially only the first plurality of pores is hydroxylated, and the second plurality of pores is substantially non-hydroxylated.

In various examples, the techniques can be used to prepare articles that include pores of different average pore sizes functionalized with different functional groups, by using sequential functionalization depending on pore size, targeting specific pore size regimes with respective functionalizing agents. Thus example articles may exhibit different functions associated with particular pore sizes within the same material. The example techniques may also be used to functionalize relatively inexpensive porous materials that present a wide range of pore sizes.

The details of one or more aspects of the invention are set forth in the accompanying drawings and the description below. Other features, objects, and advantages of the invention will be apparent from the description and drawings, and from the claims.

BRIEF DESCRIPTION OF DRAWINGS

The foregoing and other aspects of this invention are made more evident in the following Detailed Description, when read in conjunction with the attached Drawing Figures, wherein.

It should be understood that features of certain Figures of this disclosure may not necessarily be drawn to scale, and that the Figures present non-exclusive examples of the techniques disclosed herein.

DETAILED DESCRIPTION

Figure 2:
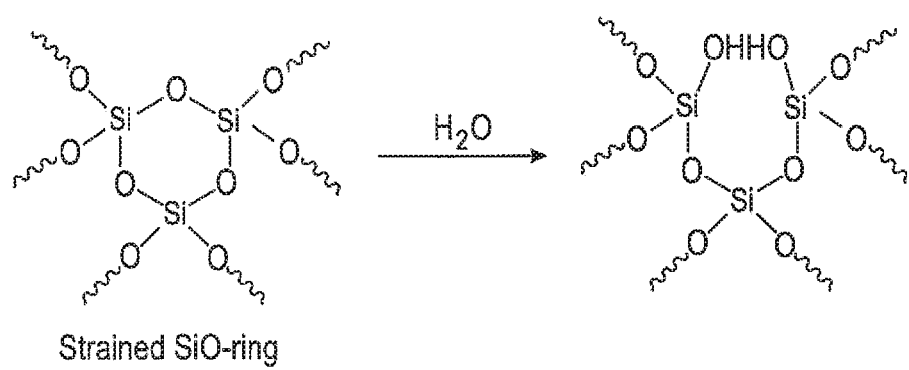
FIG. 2 is a conceptual diagram illustrating hydroxylation of an oxide.

FIG. 2 is a conceptual diagram illustrating a mechanism of hydroxylation of silica. In examples, silica including strained Si—O rings may by hydroxylated via ring-opening mechanisms. In example techniques according to the present disclosure, hydroxylation of silica and other oxides, including metal oxides and ceramics, by hydroxylating agents such as water vapor is controlled by one or more of: the capillary forces of condensed water within the pores, the reactivity of the silica surface due to strained siloxane rings (FIG. 2), and control of the relative pressure of water vapor. Controlling the relative pressure of water vapor may allow smaller pores to be hydroxylated through capillary condensation, while leaving larger pores unaffected. According to the Kelvin Equation, EQUATION I.:

$$\ln\left(\frac{p}{p_{sat}}\right) = -\frac{2\gamma V_L \cos\theta}{rRT} \quad (I)$$

In EQUATION I, $\gamma$=water surface tension, $V_L$=molar volume of water, $\theta$=water contact angle, r=pore radius, R=universal gas constant, T=temperature and $p/p_{sat}$=relative vapor pressure of water.

Figure 3:
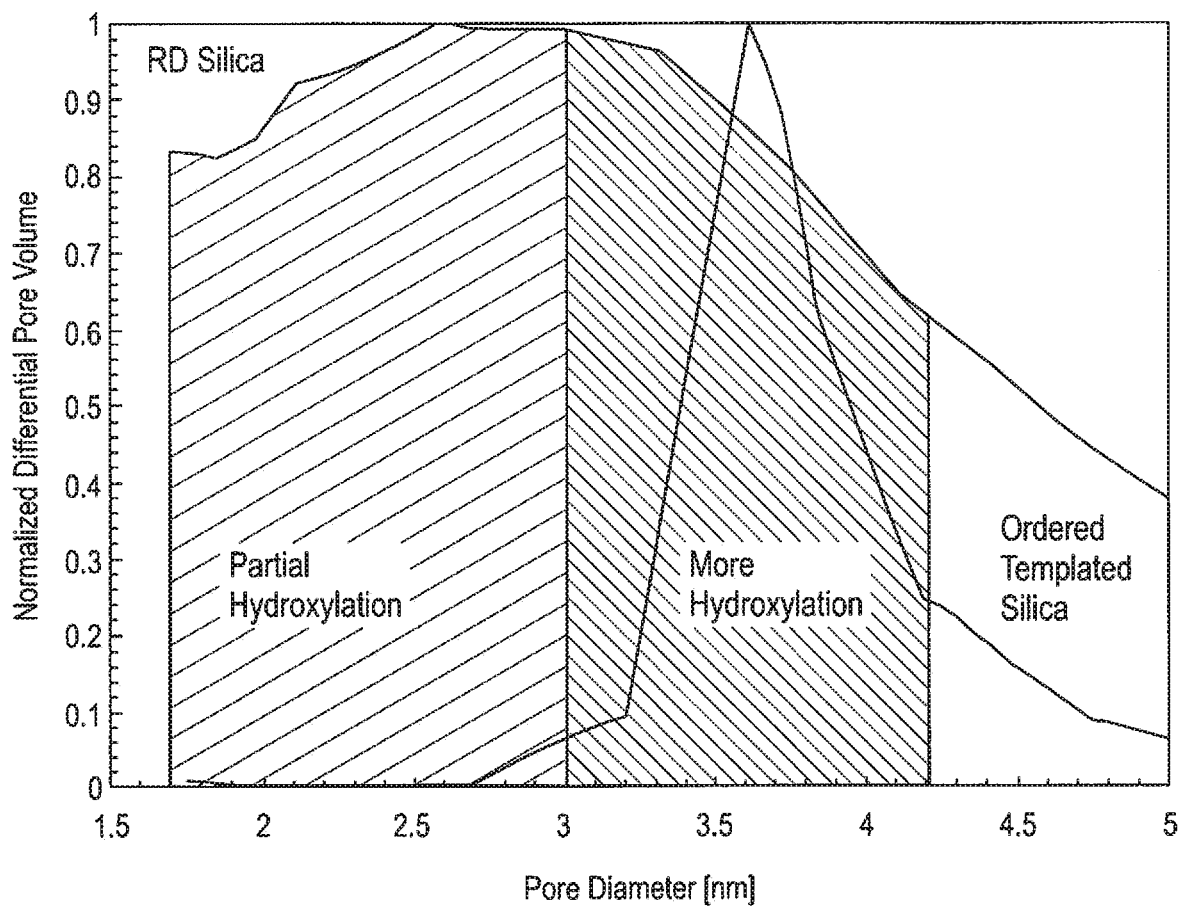
FIG. 3 is a chart illustrating the pore size distribution of commercial-grade porous silica with a broad pore size distribution and templated silica with a narrow pore size distribution.

Apart from the variables specified in EQUATION 1, which describes capillary condensation within a selected pore of a known pore size, hydroxylation of the substrate as in bulk may also be affected by the geometry of the substrate, for instance, by the distribution of pore sizes within the substrate. FIG. 3 is a plot illustrating the pore size distribution of commercial-grade porous silica with a broad pore size distribution and templated silica with a narrow pore size distribution. While known techniques can be used to functionalize ordered templated silica which presents a narrow pore size distribution as shown in FIG. 3, partial hydroxylation (generation of silanol groups) of templated silica is impractical due to the narrow pore size distribution. Further, templated silica is significantly more expensive (more than one thousand times more expensive) than commercial silica gel such as RD-silica, which has a broad pore size distribution.

Figure 1:
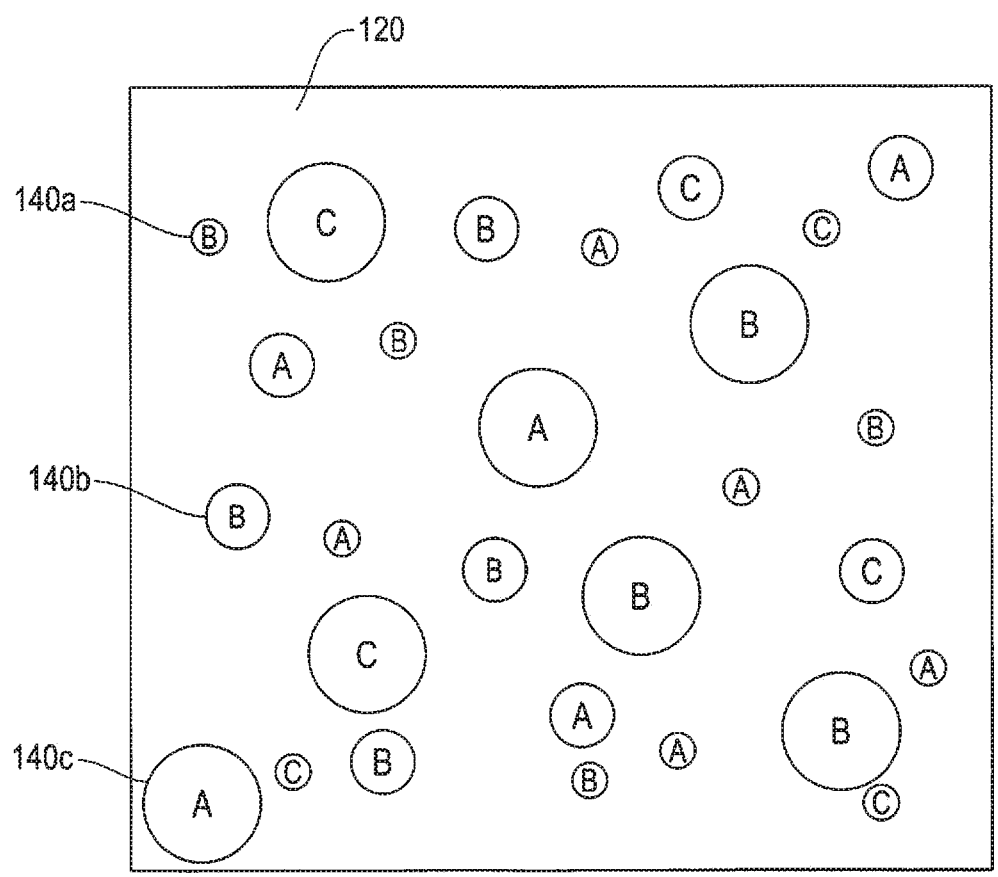
FIG. 1 is a conceptual diagram presenting a lateral cross-sectional view of a structure including a porous material exhibiting a broad pore size distribution, functionalized by nonselective techniques.

However, while commercial silica gel presenting broad pore size distribution is inexpensive, conventional techniques of functionalizing may result in nonselective functionalization of pores, where pores are randomly functionalized with functional groups irrespective of their pore size, as shown in FIG. 1.

Thus, in examples according to the present disclosure, when a substrate including pores having a first average pore size and pores having a second average pore size that is larger than the first average pore size is hydroxylated, substantially only pores having the first average pore size may be hydroxylated at relatively lower relative pressures, while pores having the larger second average pore size may remain non-hydroxylated at the lower relative pressures. Therefore, on exposing the hydroxylated porous substrate to a functionalizing agent that functionalizes hydroxylated sites, substantially only pores of the first average pore size may get functionalized with the functionalizing agent, while pores of the second average pore size may remain non-functionalized since the pores of the second average pore size were not hydroxylated in the hydroxylation step. Thereafter, the partly functionalized porous substrate can be exposed to a sufficiently larger relative pressure of the hydroxylating agent effective to hydroxylate pores of the larger second average pore size. On subsequently exposing the hydroxylated porous substrate to a second functionalizing agent, pores of the second average pore size would get functionalized with the second functional group. Further, since pores of the first average pore size were already functionalized with the first functional group, they may be unlikely to present sites available to be functionalized with the second functional group. Thus, eventually, pores of the first average pore size may be functionalized substantially only with the first functional group, while pores of the second average pore size may be functionalized substantially only with the second functional group.

Example techniques according to the disclosure can be performed on low-cost commercially available porous oxides such as commercial-grade silica, which typically presents pores of a broad range of pore sizes, selectively targeting pores of predetermined pore sizes, thus allowing careful control of the generation of surface silanol groups (Si—O—H, as shown in FIG. 2) as a function of water vapor relative pressure for multi-functionalization (functionalization of pores of different sizes with different functional groups).

Figure 4A:
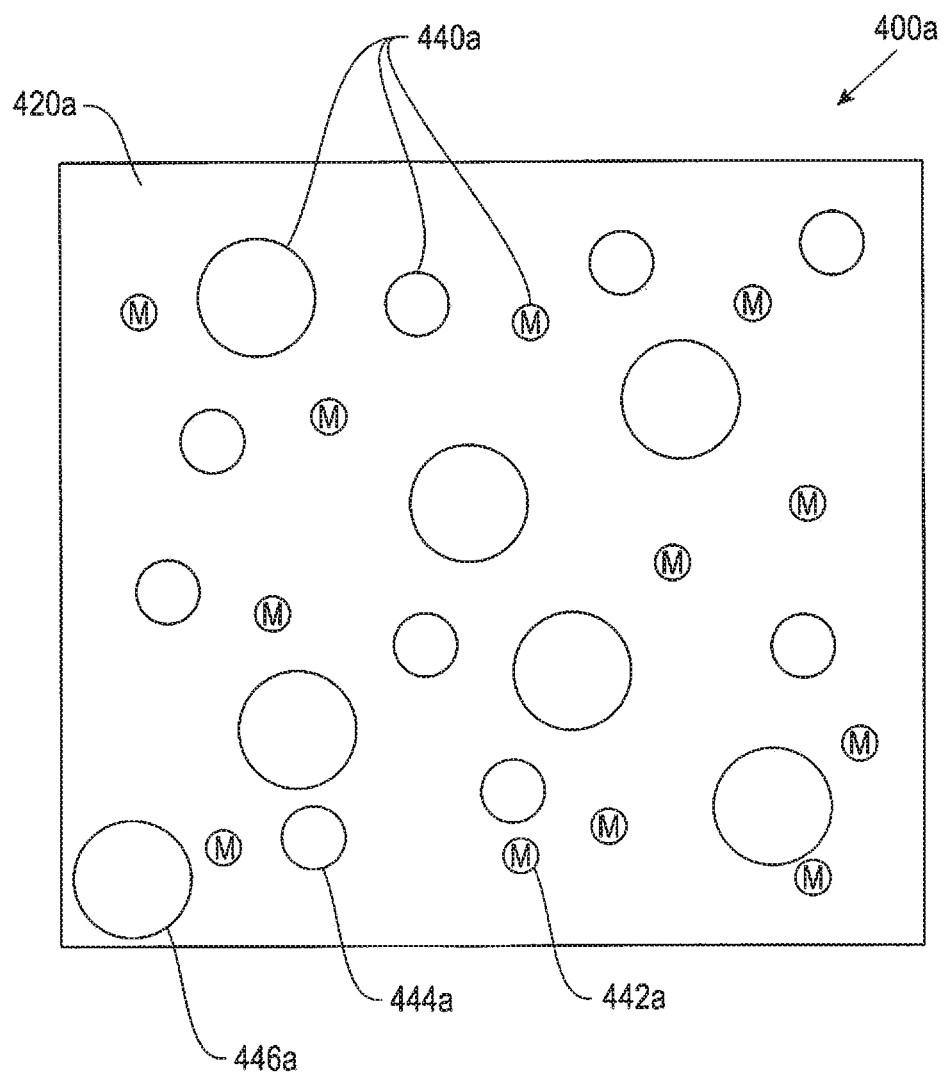
FIGS. 4A-4F are conceptual diagrams presenting lateral cross-sectional views of an example structure including a porous substrate at different stages of processing by example techniques.

FIGS. 4A-4F are conceptual diagrams presenting lateral cross-sectional views of an example structure at different stages of processing by example techniques. FIG. 4A is a conceptual diagram presenting lateral cross-sectional views of an example structure 400a. Structure 400a includes a substrate 420a, and substrate 420a includes a plurality of pores 440a. Structure 400a may be a component of any useful article, such as an integrated circuit, a sensor, a catalyst, a catalyst support, a drug delivery substrate, or any other article in which functionalized porous material may be useful. Substrate 420a may include a porous oxide, such as silica, metal oxides, ceramics, zeolites, or combinations thereof, so that substrate 420a is susceptible to at least one of hydroxylation or alkoxylation by a protic solvent. Thus, in examples, on exposing substrate 420a to a protic solvent capable of donating a hydroxyl group, surfaces of at least some pores of plurality of pores 440a of substrate 420a may get hydroxylated and present a hydroxyl group. For example, the protic solvent may include one or more of water, alcohols, acids, bases, or any other solvent capable of donating a proton. In examples, on exposing substrate 420a to a protic solvent capable of donating an alkoxyl group, surfaces of at least some pores of plurality of pores 440a of substrate 420 may get alkoxylated and present an alkoxyl group.

In examples, as shown in FIG. 4A, the plurality of pores 440a may include pores having different sizes and size distributions. For example, as shown in FIG. 4A, the plurality of pores 440a may include a first plurality of pores 442a, a second plurality of pores 444a, and a third plurality of pores 446a. The first plurality of pores 442a may have a first average pore diameter smaller than a second average pore diameter of the second plurality of pores 444a, and the second average pore diameter may be smaller than a third average pore diameter of the third plurality of pores 446a. For example, the first plurality of pores 442a may include micropores, for instance, pores having average pore diameters less than about 2 nm, the second plurality of pores 444a may include mesopores, for instance, pores having average pore diameters from about 2 nm to about 50 nm, and the third plurality of pores 446a may include macropores, for instance, pores having average pore diameters greater than about 50 nm. In examples, one or more of the first average pore diameter, the second average pore diameter, and the third average pore diameter may be less than about 20 nm. For example, the first average pore diameter and the second average pore diameter may each be less than about 20 nm. In some examples not shown in FIG. 4A, the plurality of pores 440a may include at least some interconnected pores, which in this disclosure means that the pores are joined by channels or passages, which may be regular or irregular in size and shape. In various examples, at least some pores of the plurality of pores 440 may be directly connected to the surface, and at least some pores of the plurality of pores 440 are indirectly connected to the surface via channels or passages connecting at least some pores of the plurality of pores 440 to each other.

At an initial stage, before substrate 420a is processed, none of the plurality of pores 440a may be hydroxylated or functionalized (not shown). According to example techniques, substrate 420a may be exposed to a first relative pressure of a first protic solvent. The first relative pressure may be effective to modify substantially only the plurality of pores 442a having the first average pore diameter to form a first modified porous substrate 420a, marked with "M" as shown in FIG. 4A. In various embodiments, the first protic solvent may be water, and the relative pressure may be defined in terms of the relative vapor pressure (the vapor pressure of water and the relative pressure of water are the same, since water only includes one species). For example, the first relative pressure may be associated with a relative vapor pressure ($p/p_0$, where p is the actual pressure, and $p_0$ is the saturation pressure) of up to about 0.5. In examples, the protic solvent may be capable of donating a hydroxyl group (—OH), and the first plurality of pores 442a may be hydroxylated. In examples, the protic solvent may be capable of donating an alkoxy group (—OR), and the first plurality of pores may be alkoxylated. Thus, after exposing the porous substrate 420 to the first relative pressure of the first protic solvent, the first modified porous substrate 420a includes modified (hydroxylated or alkoxylated) first plurality of pores 442a, and unmodified second plurality of pores 444a and unmodified third plurality of pores 446a as shown in FIG. 4A.

After modification, the first modified porous substrate 420a may be exposed to a first functionalizing agent that is effective to functionalize one or both of hydroxylated or alkoxylated surfaces with a functional group "A". Thus, on reacting the first modified porous substrate 420a with the first functionalizing reagent, the first functionalizing reagent will functionalize substantially only the first plurality of pores 442a, forming in a first functionalized porous substrate 420b. First functionalized porous substrate 420b includes functionalized first plurality of pores 442b, and unmodified and non-functionalized second plurality of pores 444b and unmodified and non-functionalized third plurality of pores 446b, as shown in FIG. 4B.

Figure 4B:
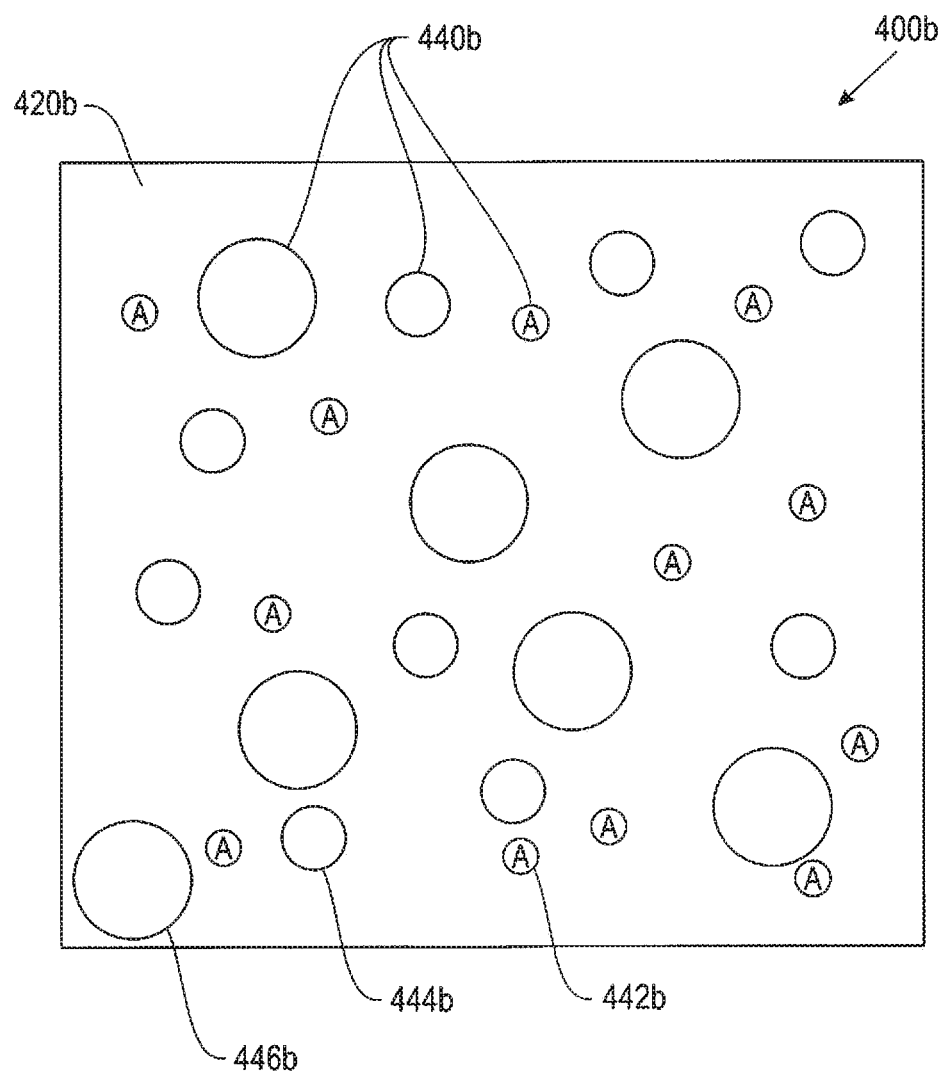

Thus, an example article may include a functionalized porous substrate 420b including the first plurality of pores 442a having the first average pore diameter and the second plurality of pores 444b having the second average pore diameter that is greater than the first average pore diameter, wherein substantially only the first plurality of pores 442a is functionalized with a first predetermined functional group, and the second plurality of pores is substantially free of the first predetermined functional group, as shown in FIG. 4B.

Figure 4C:
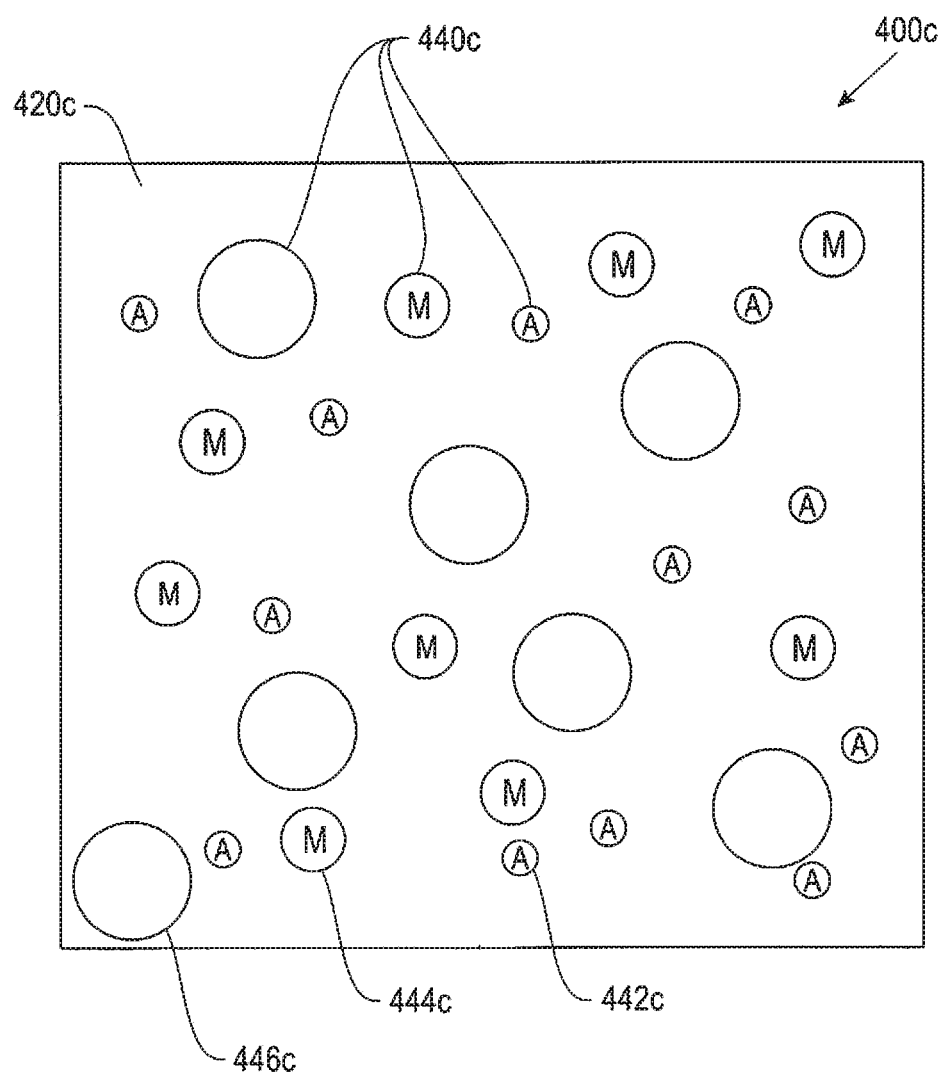

The first functionalized porous substrate 420b may be further processed, according to example techniques, as described below. In examples, the first functionalized porous substrate 420b may be exposed to a second relative pressure of the first protic solvent that is different from the first relative pressure, for example, that may be higher or lower than the first relative pressure. The second relative pressure is effective to modify, one or both of hydroxylate or alkoxylate, substantially only the second plurality of pores 444b of the second average pore diameter, to form a second modified porous substrate 420c, as shown in FIG. 4C. For example, the second relative pressure may be associated with a relative vapor pressure ($p/p_0$) in a range of from about 0.5 to about 0.6. The second modified porous substrate 420c includes the first plurality of pores 442c previously functionalized with functional group A, and includes the second plurality of pores 444c modified by a hydroxyl or an alkoxy group, marked with "M", while the third plurality of pores 446c are neither modified nor functionalized.

Figure 4D:
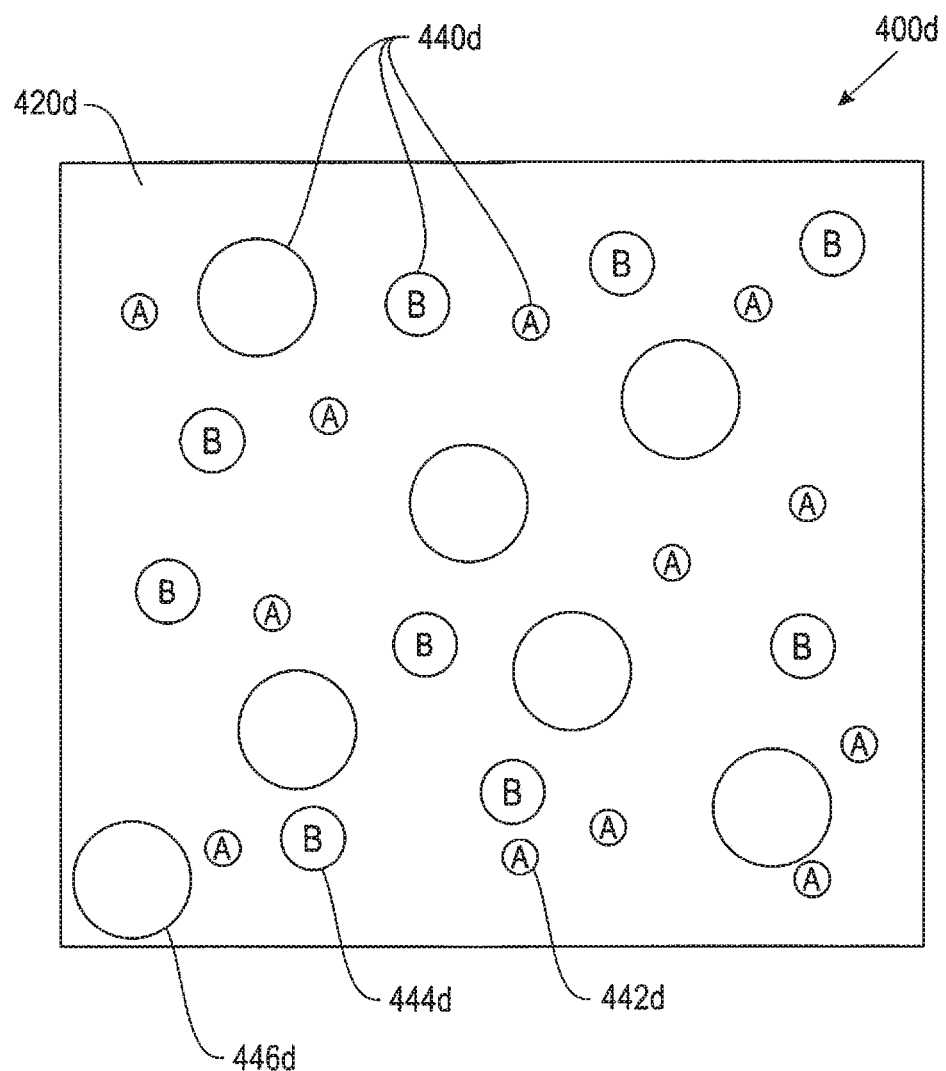

After modification, the second modified porous substrate 420c may be exposed to a second functionalizing agent that is effective to functionalize one or both of hydroxylated or alkoxylated surfaces with a functional group "B". Thus, on reacting the second modified porous substrate 420c with the second functionalizing reagent, the second functionalizing reagent will functionalize substantially only the second plurality of pores 444a, forming a second functionalized porous substrate 420d, as shown in FIG. 4D. The first plurality of pores 442 was previously modified and functionalized with functional group A, and therefore was neither modified nor functionalized when exposed to the second functional group. Since the third plurality of pores 446c was not modified (hydroxylated or alkoxylated), the second functionalizing reagent is not effective to functionalize the third plurality of pores 446c, and the third plurality of pores 446 continue to remain unmodified and non-functionalized, as shown in FIG. 4D.

Thus, an example article may include a functionalized porous substrate 420d including the first plurality of pores 442d having the first average pore diameter, the second plurality of pores 444d having the second average pore diameter that is greater than the first average pore diameter, and the third plurality of pores 446d having a third average pore diameter that is greater than the second average pore diameter, wherein substantially only the first plurality of pores 442d is functionalized with the first predetermined functional group, substantially only the second plurality of pores 444d is functionalized with the second predetermined functional group, while the third plurality of pores 446d is substantially free of the first functional group and the second functional group, as shown in FIG. 4D.

Figure 4E:
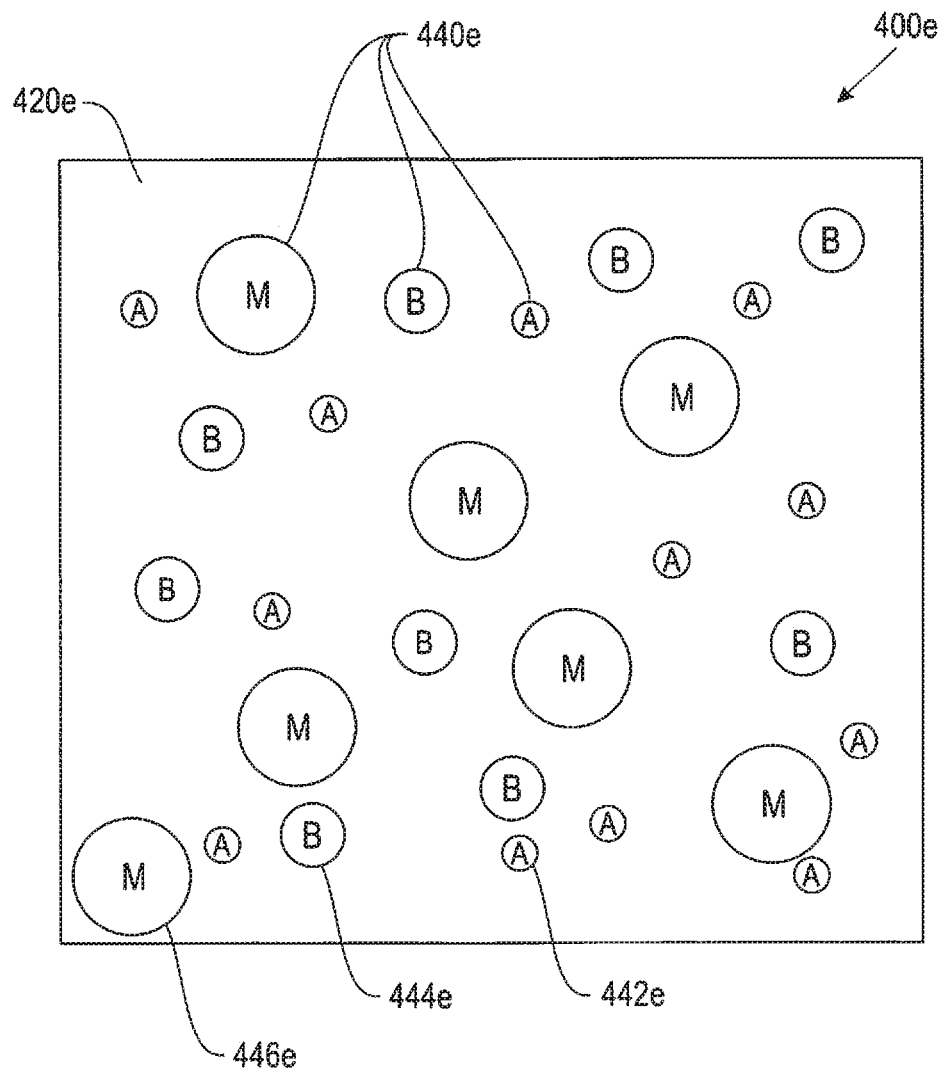

The third functionalized porous substrate 420d may be further processed, according to example techniques, as described below. In examples, the first functionalized porous substrate 420d may be exposed to a third relative pressure of the first protic solvent that is different from the first and the second relative pressure, for example, that is higher or lower than one or both of the first relative pressure and second relative pressure. The third relative pressure is effective to modify, one or both of hydroxylate or alkoxylate, substantially only the third plurality of pores 446d of the third average pore diameter, to form a third modified porous substrate 420e, as shown in FIG. 4E. For example, the third relative pressure may be associated with a relative vapor pressure ($p/p_0$) greater than about 0.6. The third modified porous substrate 420e includes the first plurality of pores 442e previously functionalized with functional group A, the second plurality of pores 444e previously functionalized with functional group B, the third plurality of pores 446e modified by a hydroxyl or an alkoxy group, marked with "M".

Figure 4F:
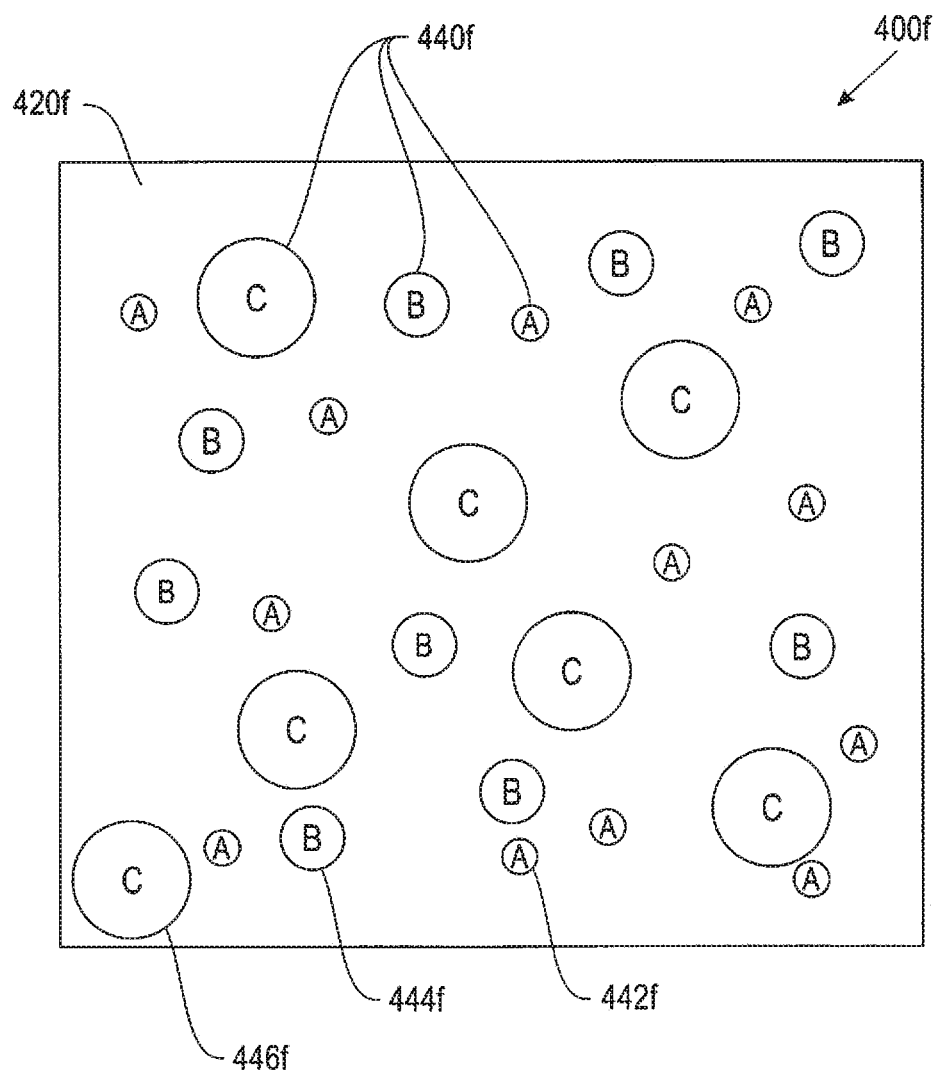

After modification, the third modified porous substrate 420e may be exposed to a third functionalizing agent that is effective to functionalize one or both of hydroxylated or alkoxylated surfaces with a functional group "C". Thus, on reacting the second modified porous substrate 420e with the third functionalizing reagent, the third functionalizing reagent will functionalize substantially only the third plurality of pores 446e, forming a third functionalized porous substrate 420f, as shown in FIG. 4F. The first plurality of pores 442f was previously modified and functionalized with functional group A, and therefore was neither modified nor functionalized when exposed to the third functional group. Similarly, the second plurality of pores 444f was previously modified and functionalized with functional group B, and therefore was neither modified nor functionalized when exposed to the third functional group. Substantially only the third plurality of pores 446f is functionalized with functional group C from the third functionalizing agent, as shown in FIG. 4F.

Thus, an example article may include a functionalized porous substrate 420f including the first plurality of pores 442f having the first average pore diameter, the second plurality of pores 444f having the second average pore diameter that is greater than the first average pore diameter, and the third plurality of pores 446f having the third average pore diameter that is greater than the second average pore diameter, wherein substantially only the first plurality of pores 442f is functionalized with the first predetermined functional group, substantially only the second plurality of pores 444f is functionalized with the second predetermined functional group, and substantially only the third plurality of pores 446f is functionalized with the third predetermined functional group, as shown in FIG. 4F.

In examples, one or more of the first functionalizing reagent, the second functionalizing reagent, and the third functionalizing reagent, or any functionalizing agent, may include one or more of thiols, amines, alkoxides, epoxides, carboxylic acids, carboxylic esters, sulfonic acids, sulfonate esters, aldehydes, ketones, phosphines, halides, cyano alkyl, isocyanato alkyl, unsaturated alkyl, unsaturated cyclic alkyls, etc. and metal alkoxy, acyloxy, halogen or amino groups capable of reacting with hydroxylated metal oxide surfaces. In examples, functionalizing agents for metal oxide derived hydroxylates may include a metal atom (for example, Si, Ge, Ti, or other suitable metal atom) bonded to reactive groups (alkoxy, acyloxy, halogen or amine) on one end and an organofunctional group on the other end. The organofunctional group may be attached to the metal atom via an organic spacer group. In examples, functionalizing agents may include cyclic azasilanes.

While in the examples above, the first protic solvent is used for modifying one or more of the first plurality of pores, the second plurality of pores, and the third plurality of pores, in examples described below, different protic solvents may be used to modify each of the first plurality of pores, the second plurality of pores, and the third plurality of pores. For example, one of the plurality of pores may be exposed to a first protic solvent capable of hydroxylation, and subsequently exposed to a second protic solvent capable of alkoxylation, so that a first plurality of pores may be hydroxylated, while a second plurality of pores is alkoxylated, before they are respectively functionalized.

Example articles having being described above, example techniques of the present disclosure are described below with reference to FIGS. 5 and 6.

Figure 5:
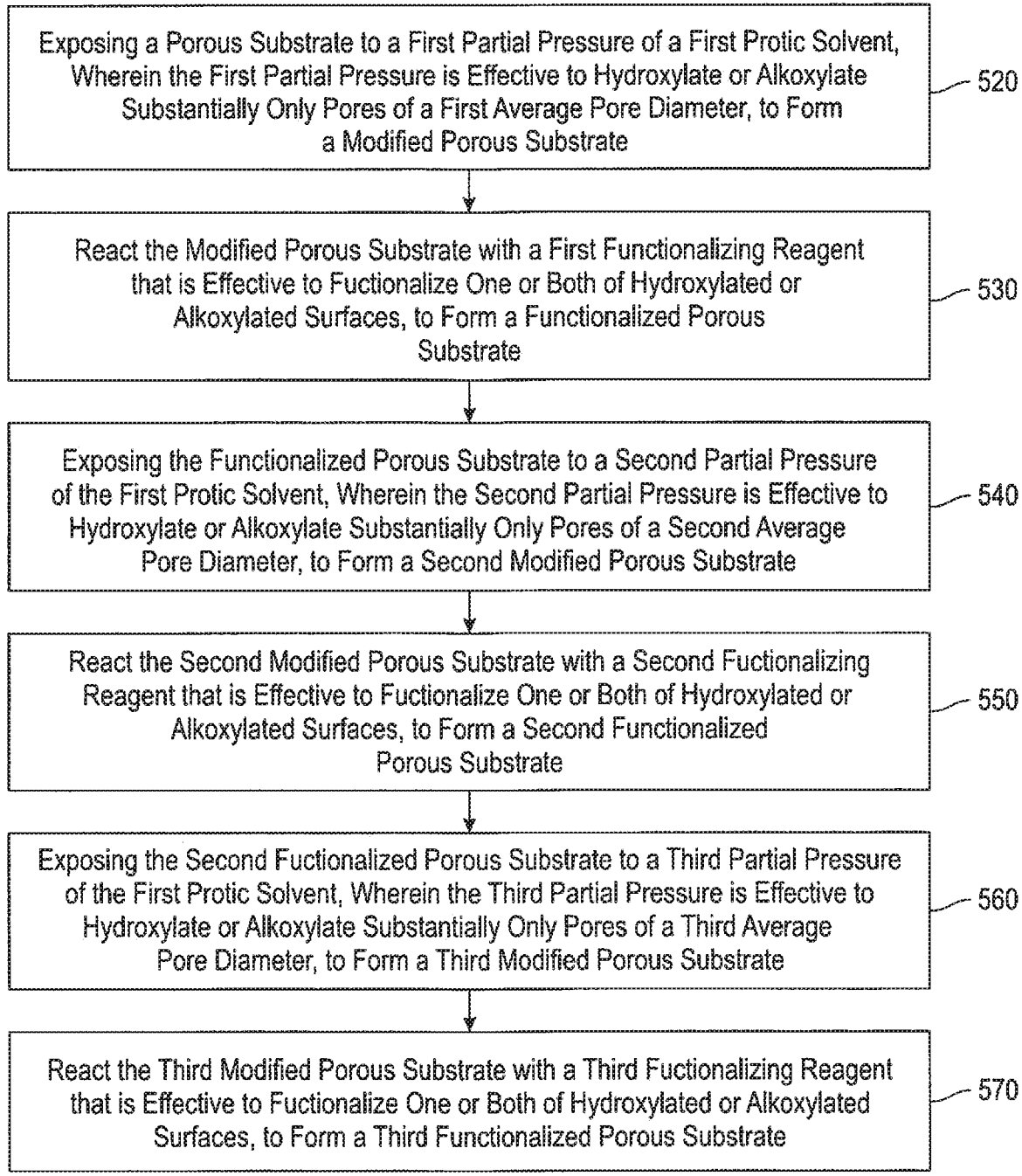
FIG. 5 is a flow diagram illustrating an example technique for selectively functionalizing a porous substrate.

FIG. 5 is a flow diagram illustrating an example technique for selectively functionalizing a porous substrate.

The example technique includes exposing a porous substrate to a first relative pressure of a first protic solvent (520). The porous substrate is susceptible to one or both of hydroxylation and alkoxylation by the first protic solvent. The porous substrate includes a first plurality of pores having a first average pore diameter and a second plurality of pores having a second average pore diameter that is greater than the first average pore diameter. The first relative pressure is effective to one or both of hydroxylate or alkoxylate substantially only pores of the first average pore diameter to form a first modified porous substrate.

The example technique further includes reacting the first modified porous substrate with a first functionalizing reagent that is effective to functionalize one or both of hydroxylated or alkoxylated surfaces, thereby functionalizing substantially only the first plurality of the pores, to form a first functionalized porous substrate (530).

The example technique optionally includes further exposing the first functionalized porous substrate to a second relative pressure of the first protic solvent that is higher than the first relative pressure. The second relative pressure is effective to one or both of hydroxylate or alkoxylate substantially only pores of the second average pore diameter to form a second modified porous substrate (540). If optional step 540 is performed, subsequently, the technique may include reacting the second modified porous substrate with a second functionalizing reagent, thereby functionalizing substantially only the second plurality of pores, to form a second functionalized porous substrate (550).

The example technique optionally includes further exposing the second functionalized porous substrate to a third relative pressure of the first protic solvent that is higher than the first relative pressure. The third relative pressure is effective to one or both of hydroxylate or alkoxylate substantially only pores of the third average pore diameter to form a third modified porous substrate (560). If optional step 560 is performed, subsequently, the example technique may include reacting the third modified porous substrate with a third functionalizing reagent, thereby functionalizing substantially only the third plurality of pores, to form a third functionalized porous substrate (570).

In example techniques, instead of using the same first protic solvent for subsequent modification steps, different protic solvents may be used, as described with reference to the example technique of FIG. 6 below.

Figure 6:
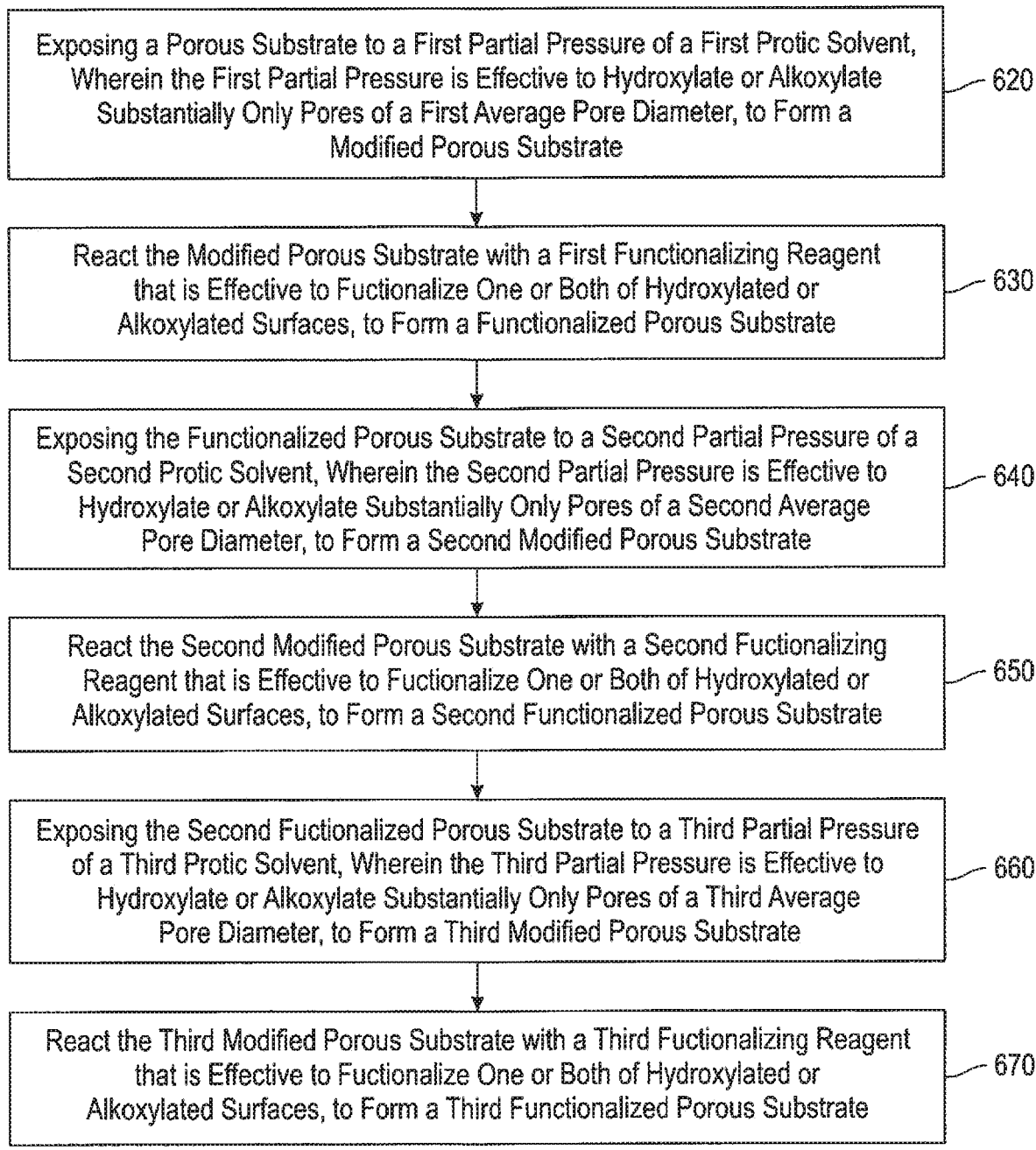
FIG. 6 is a flow diagram illustrating an example technique for selectively functionalizing a porous substrate.

FIG. 6 is a flow diagram illustrating an example technique for selectively functionalizing a porous substrate. The example technique includes exposing a porous substrate to a first relative pressure of a first protic solvent (620). The example technique further includes reacting the first modified porous substrate with a first functionalizing reagent that is effective to functionalize one or both of hydroxylated or alkoxylated surfaces, thereby functionalizing substantially only the first plurality of the pores, to form a first functionalized porous substrate (630). The example technique optionally includes further exposing the first functionalized porous substrate to a second relative pressure of a second protic solvent that is different from the first relative pressure, for example, that may be higher or lower than the first relative pressure. The second protic solvent is different in composition from the first protic solvent. The second relative pressure is effective to one or both of hydroxylate or alkoxylate substantially only pores of the second average pore diameter to form a second modified porous substrate (640). If optional step 640 is performed, subsequently, the technique may include reacting the second modified porous substrate with a second functionalizing reagent, thereby functionalizing substantially only the second plurality of pores, to form a second functionalized porous substrate (650).

The example technique optionally includes further exposing the second functionalized porous substrate to a third relative pressure of a third protic solvent that is different from than the first relative pressure, for example, that may be higher or lower than one or both of the first relative pressure and the second relative pressure. The third protic solvent is different in composition from the first and the second protic solvents. The third relative pressure is effective to one or both of hydroxylate or alkoxylate substantially only pores of the third average pore diameter to form a third modified porous substrate (660). If optional step 660 is performed, subsequently, the example technique may include reacting the third modified porous substrate with a third functionalizing reagent, thereby functionalizing substantially only the third plurality of pores, to form a third functionalized porous substrate (670).

Thus, example techniques according to the present disclosure can be used to prepare example articles including a functionalized porous substrate including a first plurality of pores having a first average pore diameter and a second plurality of pores having a second average pore diameter that is greater than the first average pore diameter, wherein substantially only the first plurality of pores is functionalized with a first predetermined functional group, and the second plurality of pores is substantially free of the first predetermined functional group.

Articles according to the present disclosure can be used as a single base material for multiple applications, and reduce costs because expensive templates are not needed to define pore size. The techniques according to the present disclosure are highly scalable, and can provide articles with multiple functions or applications, since pores of different sizes can be functionalized with different functional groups suitable for different applications. For example, articles according to the present disclosure can be used for sequential drug release depending on the pore size of pores hosting different drug molecules, or can be used for catalytic cascades by hosting different catalytic groups within pores of different sizes or only allowing reagents of certain sizes access to pores of predetermined sizes. While hydroxylated and non-hydroxylated pores have been described with respect to examples, in examples, a group of hydroxylated pores may include some non-hydroxylated pores, and a group of non-hydroxylated pores may include some hydroxylated pores, for example, residual hydroxylated pores. In examples, hydroxylated pores may refer to pores that are substantially hydroxylated, and non-hydroxylated pores may refer to pores that are substantially non-hydroxylated or pores that may present some or limited hydroxylation, for example, a relatively smaller extent of hydroxylation compared to the hydroxylated pores. The techniques and articles described above can also be used in other applications that can benefit from disposing different functional groups in pores of different average pore sizes. "Substantially only" pores of a class may include at least 80% of the pores of that class, at least 90% of the pores of that class, at least 98% of the pores of that class, at least 99% of the pores of that class, at least 99.9% of the pores of that class, substantially all, or all pores of that class, while substantially excluding pores of other classes.

The present disclosure will be illustrated by the following non-limiting examples.

EXAMPLES

Example 1

Figure 7:
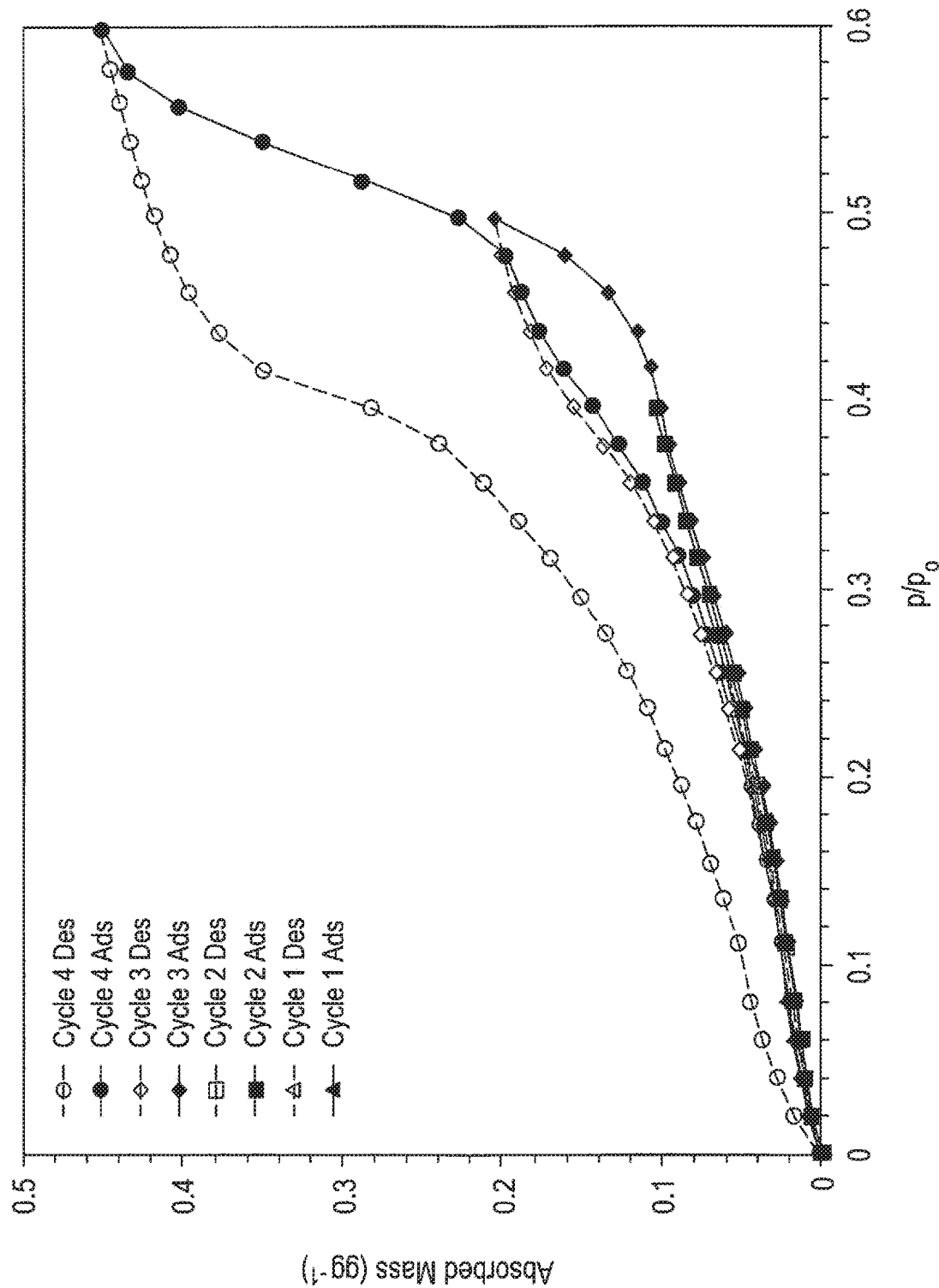
FIG. 7 is a chart illustrating water adsorption isotherms of calcined porous silica exposed to relative pressure cycles of water vapor.

FIG. 7 is a chart illustrating water adsorption isotherms of calcined porous silica exposed to relative pressure cycles of water vapor. Commercial RD-type silica gel (supplier Fuji Silysia) was calcined at 600° C. for 3 hours and subsequently exposed to various increasing relative pressures of water vapor at 50° C., in cycles ranging from $p/p_{sat}$ values between 0 at one end, and one of 0.3 (Cycle 1 in FIG. 5), 0.4 (Cycle 2 in FIG. 5), 0.5 (Cycle 3 in FIG. 5), and 0.6 (Cycle 4 in FIG. 5) at the other end. FIG. 5 illustrates both adsorption and desorption within each cycle.

For $p/p_0$ values up to 0.4 (Cycle 1 and Cycle 2), the curves for water vapor adsorption and desorption follow along the same path for each cycle. At higher relative pressures, i.e., $p/p_0$ values of 0.5 (Cycle 3) and 0.6 (Cycle 4), adsorption of water vapor now occurs primarily through apparent capillary condensation. This is evidenced by the sharp increase in the slope of the adsorption isotherm. In this pressure regime, the desorption curve does not follow the initial adsorption path, indicating an increase of surface hydrophilicity, i.e., generation of surface silanol (SiOH) groups. These groups are now available for functionalization, while at the same time corresponding to a specific pore size regime. The final adsorption/desorption isotherm, Cycle 4, traces the desorption curve of Cycle 3 during adsorption, then increases steeply upon exposure to even higher relative pressure and then returns on a different path upon desorption, commensurate with the generation of even more surface silanol groups. These groups are associated with an even larger pore size and are available for subsequent functionalization reactions.

Various examples of the invention have been described. These and other examples are within the scope of the following claims.

What is claimed is:

1. A method, comprising:
   exposing a porous substrate susceptible to one or both of hydroxylation and alkoxylation by a first protic solvent to a first relative pressure of the first protic solvent, wherein the porous substrate comprises a first plurality of pores having a first average pore diameter and a second plurality of pores having a second average pore diameter that is greater than the first average pore diameter, wherein the first relative pressure is effective to one or both of hydroxylate or alkoxylate substantially only pores of the first average pore diameter to form a first modified porous substrate; and
   reacting the first modified porous substrate with a first functionalizing reagent that is effective to functionalize one or both of hydroxylated or alkoxylated surfaces, thereby functionalizing substantially only the first plurality of the pores, to form a first functionalized porous substrate, wherein in the first functionalized substrate, the second plurality of pores is substantially free of the first predetermined functional group and the first plurality of pores is functionalized with the first predetermined functional group via at least one of a hydroxyl group or an alkoxyl group.

2. The method of claim 1, further comprising:
   exposing the first functionalized porous substrate to a second relative pressure of the first protic solvent that is higher than the first relative pressure, wherein the second relative pressure is effective to one or both of hydroxylate or alkoxylate substantially only pores of the second average pore diameter to form a second modified porous substrate; and
   reacting the second modified porous substrate with a second functionalizing reagent that is effective to functionalize one or both of hydroxylated or alkoxylated surfaces, thereby functionalizing substantially only the second plurality of pores, to form a second functionalized porous substrate.

3. The method of claim 1, wherein the first average pore diameter and the second average pore diameter are each less than about 20 nm.

4. The method of claim 1, wherein the protic solvent comprises one or more members selected from the group consisting of water, alcohols, acids, bases, any other solvent capable of donating a proton, and combinations of the foregoing.

5. The method of claim 1, wherein the first functionalizing reagent comprises one or more members selected from the group consisting of thiols, amines, alkoxides, epoxides, carboxylic acids, carboxylic esters, sulfonic acids, sulfonate esters, aldehydes, ketones, phosphines, halides, cyano alkyl, isocyanato alkyl, unsaturated alkyl, unsaturated cyclic alkyls, metal alkoxy, acyloxy, halogens, amino groups, groups capable of reacting with hydroxylated or alkoxylated metal oxide surfaces, and combinations of the foregoing.

6. The method of claim 1, wherein the porous substrate comprises one or more members selected from the group consisting of a porous oxide, a metal oxide, silica, ceramic, zeolite, porous carbon, and combinations of the foregoing.

7. The method of claim 2, further comprising:
   exposing the second functionalized porous substrate to a third relative pressure of the first protic solvent that is higher than the second relative pressure, wherein the third relative pressure is effective to one or both of hydroxylate or alkoxylate substantially only pores of a third average pore diameter, wherein the porous substrate comprises a third plurality of pores having the third average pore diameter, to form a third modified porous substrate; and
   further reacting the third modified porous substrate with a third functionalizing reagent that is effective to functionalize one or both of hydroxylated or alkoxylated surfaces, thereby functionalizing substantially only the third plurality of pores, to form a third functionalized porous substrate.

8. The method of claim 7, wherein the first average pore diameter is less than about 2 nm, the second average pore diameter is from about 2 nm to about 20 nm, and the third average pore diameter is greater than about 20 nm.

9. The method of claim 1, further comprising:
   exposing the first functionalized porous substrate to a second relative pressure of a second protic solvent, wherein the second relative pressure is effective to one or both of hydroxylate or alkoxylate substantially only pores of the second average pore diameter to form a second modified porous substrate; and
   further reacting the second modified porous substrate with a second functionalizing reagent that is effective to functionalize one or both of hydroxylated or alkoxylated surfaces, thereby functionalizing substantially only the second plurality of pores, to form a second functionalized porous substrate.

10. The method of claim 9, further comprising:
    exposing the second functionalized porous substrate to a third relative pressure of a third protic solvent, wherein the third relative pressure is effective to one or both of hydroxylate or alkoxylate substantially only pores of a third average pore diameter, wherein the porous substrate comprises a third plurality of pores having the third average pore diameter, to form a third modified porous substrate; and
    further reacting the third modified porous substrate with a third functionalizing reagent that is effective to functionalize one or both of hydroxylated or alkoxylated surfaces, thereby functionalizing substantially only the third plurality of pores, to form a third functionalized porous substrate.

11. A method, comprising:
    providing a porous oxide comprising pre-existing pores having a variety of sizes ranging from sub-nm to 20 nm;
    exposing the porous oxide to a first relative pressure of a protic solvent, thereby creating one or both of hydroxy and alkoxy groups within a first subset of the pores, to form a modified porous oxide;
    reacting the modified porous oxide with a first functionalizing reagent, thereby derivatizing the first subset of the pores, to form a functionalized porous oxide; and
    exposing the functionalized porous oxide to a second relative pressure of the protic solvent or a second protic solvent, wherein the second relative pressure is higher than the first relative pressure, thereby creating one or both of hydroxyl and alkoxy groups within a second subset of the pores having a larger size than the pores in the first subset of the pores, to form a second modified porous oxide; and reacting the second modified porous oxide with a second functionalizing reagent, thereby derivatizing the second subset of the pores, to form a second functionalized porous oxide.

12. The method of claim 11, further comprising:

exposing the second functionalized porous oxide to a third relative pressure of the protic solvent or a third protic solvent, wherein the third relative pressure is higher than the second relative pressure, thereby creating one or both of hydroxyl and alkoxy groups within a third subset of the pores having a larger size than the pores in the second subset of the pores, to form a third modified porous oxide; and reacting the third modified porous oxide with a third functionalizing reagent, thereby derivatizing the third subset of the pores, to form a third functionalized porous oxide.

* * * * *